United States Patent [19]
Thomson

[11] Patent Number: 5,720,239
[45] Date of Patent: Feb. 24, 1998

[54] ANIMAL WATERING TANK

[75] Inventor: Carter Thomson, Grinnell, Iowa

[73] Assignee: Ahrens Agricultural Industries, Inc., Grinnell, Iowa

[21] Appl. No.: 619,328

[22] Filed: Mar. 21, 1996

[51] Int. Cl.⁶ .................................................. A01K 7/02
[52] U.S. Cl. .................................... 119/74; 119/73
[58] Field of Search .................... 119/51.03, 72, 119/73, 74

[56] References Cited

U.S. PATENT DOCUMENTS

| | | | |
|---|---|---|---|
| 3,150,639 | 9/1964 | Sereda | 119/73 |
| 4,386,582 | 6/1983 | Adsit | 119/51.03 |
| 4,426,956 | 1/1984 | McKinstry | 119/72 |
| 4,559,905 | 12/1985 | Ahrens | 119/73 |
| 4,739,727 | 4/1988 | Boyer | 119/73 |
| 4,922,858 | 5/1990 | Ahrens | 119/73 |
| 4,953,507 | 9/1990 | Robinson | 119/73 |
| 5,437,244 | 8/1995 | Van Gilst | 119/72 X |

FOREIGN PATENT DOCUMENTS 471667  5/1953  Italy .................................. 119/51.03

*Primary Examiner*—Robert P. Swiatek
*Assistant Examiner*—Elizabeth Shaw
*Attorney, Agent, or Firm*—Zarley, McKee, Thomte, Voorhees & Sease

[57] ABSTRACT

An animal watering tank includes a spherical ball closure member which is returnable to its closed position by a track which extends laterally and downwardly into the water. The track is of one piece construction and is secured to the bottom side of the top wall of the tank in an upwardly extending locating recess.

6 Claims, 3 Drawing Sheets

ANIMAL WATERING TANK

BACKGROUND OF THE INVENTION

Spherical ball animal watering tanks are successful and popular as represented in Ahrens Agricultural Industries Co. U.S. Pat. No. 4,559,905, dated Dec. 24, 1985. The ball in this patent when displaced by an animal seeking water moves along a track laterally to the side of the access opening. The track has rail members which converge as they move away from the access opening, thus, tending to force the ball horizontally back to close the access opening. While the rail members are at the same horizontal height throughout their length, the ball is depressed further and further into the water the further it moves from the access opening.

The track concept for a ball return to the access opening in an animal watering tank is a good idea and can be improved upon in terms of simplicity of structure and cost to manufacture.

SUMMARY OF THE INVENTIONS

The ball return track of this invention is of a one-piece construction, triangular in shape with one of the sides being curved downwardly and laterally outwardly. As the ball moves along the curved surface it not only moves laterally but downwardly in the water in the tank. The curved path will guide the ball back to the access opening after the animal has completed drinking and removes its head from the access opening.

The one piece track is held to the top wall of the tank in an upwardly facing recess the shape of one of the sides of the track piece. A pair of fasteners extend from the top side of the tank wall through the wall into the track. The one piece track extends downwardly into the water sufficiently far that the distance between its lower end and the tank bottom wall is smaller than the diameter of the ball, such that the ball cannot pass under the track.

DESCRIPTION OF THE PREFERRED EMBODIMENT

Figure 1:
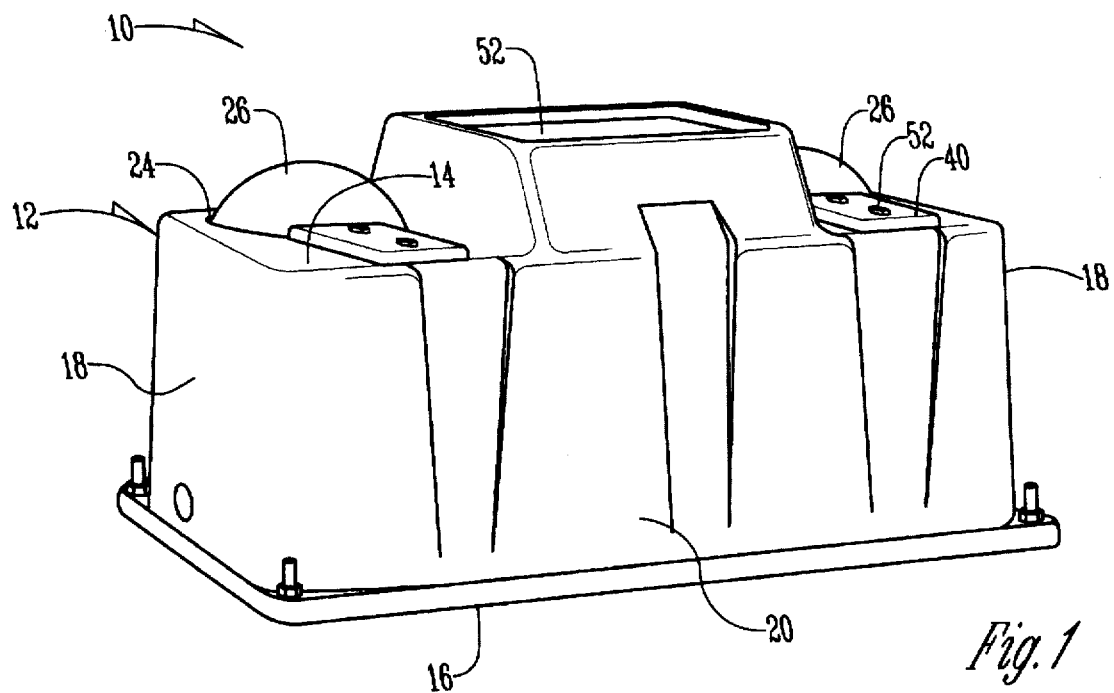
FIG. 1 is a front perspective view of the animal watering tank of this invention.
Figure 4:
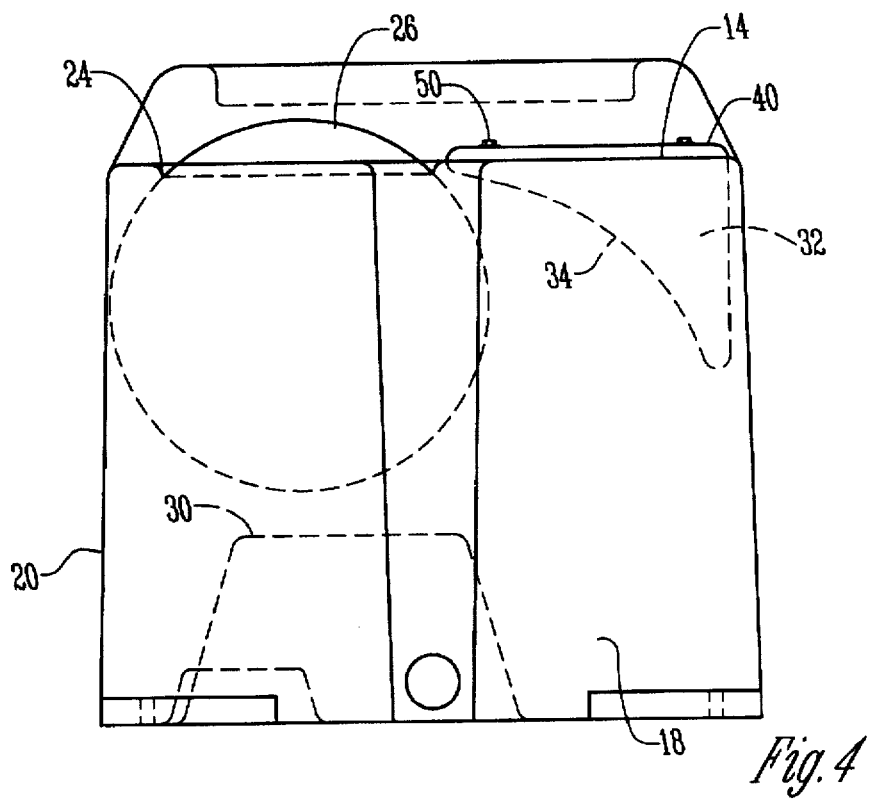
FIG. 4 is an end elevational view thereof, taken from the left end in FIG. 1.

The animal watering tank of this invention is referred to in FIG. 1 generally by the reference numeral 10 and includes a tank 12 having a top wall 14, bottom 16, opposite end walls 18, and opposite side walls 20.

Figure 3:
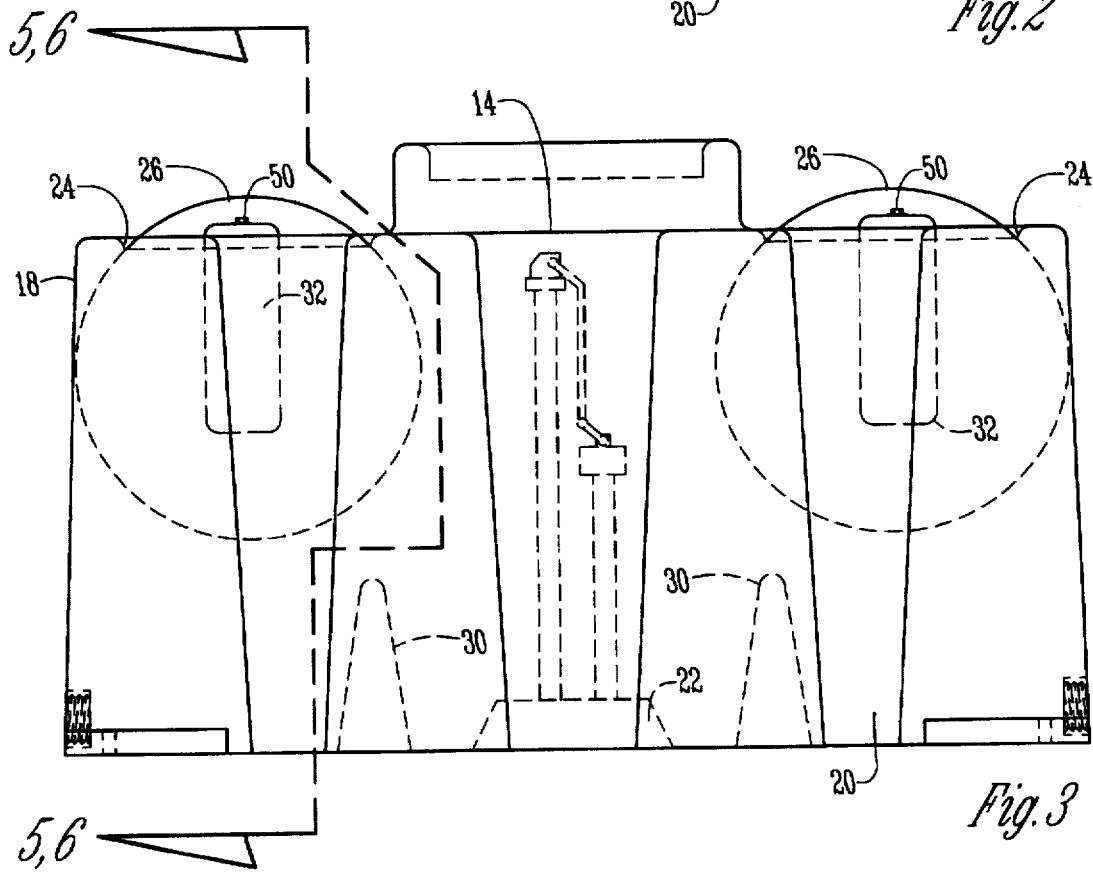
FIG. 3 is a rear elevational view thereof.
Figure 5:
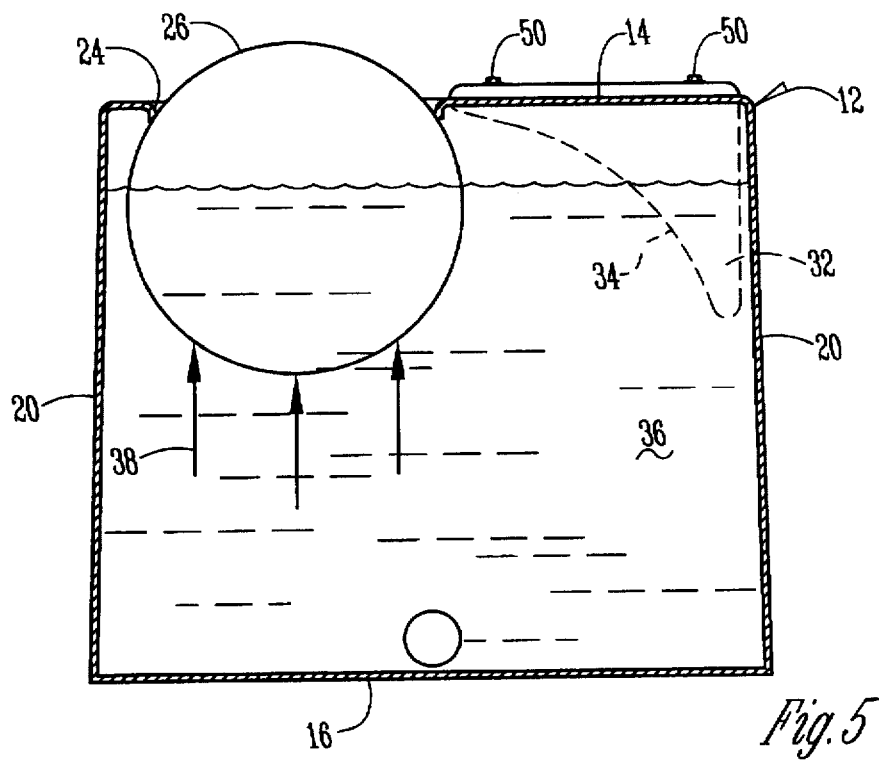
FIG. 5 is a cross-sectional view taken along line 5—5 in FIG. 3 showing the ball in its position closing the animal access opening.

A conventional valve assembly 22 as seen in FIG. 3 maintains a constant water level in the tank. As water is consumed by animals, more water is allowed to enter through the valve assembly 22.

Figure 2:
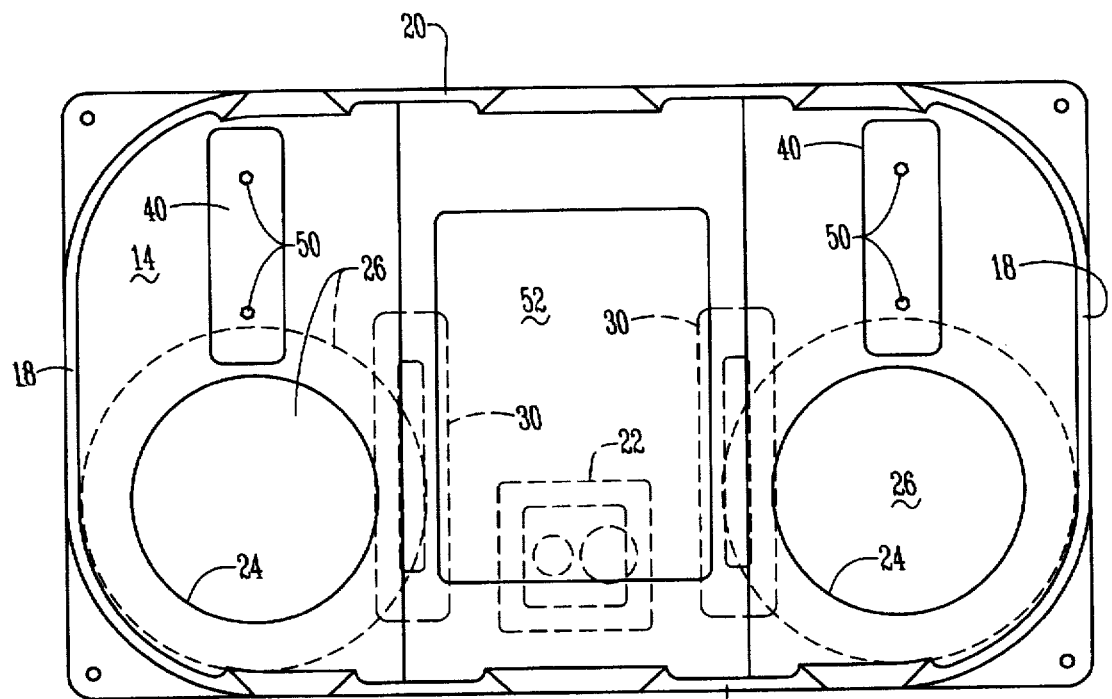
FIG. 2 is a top plan view thereof.
Figure 6:
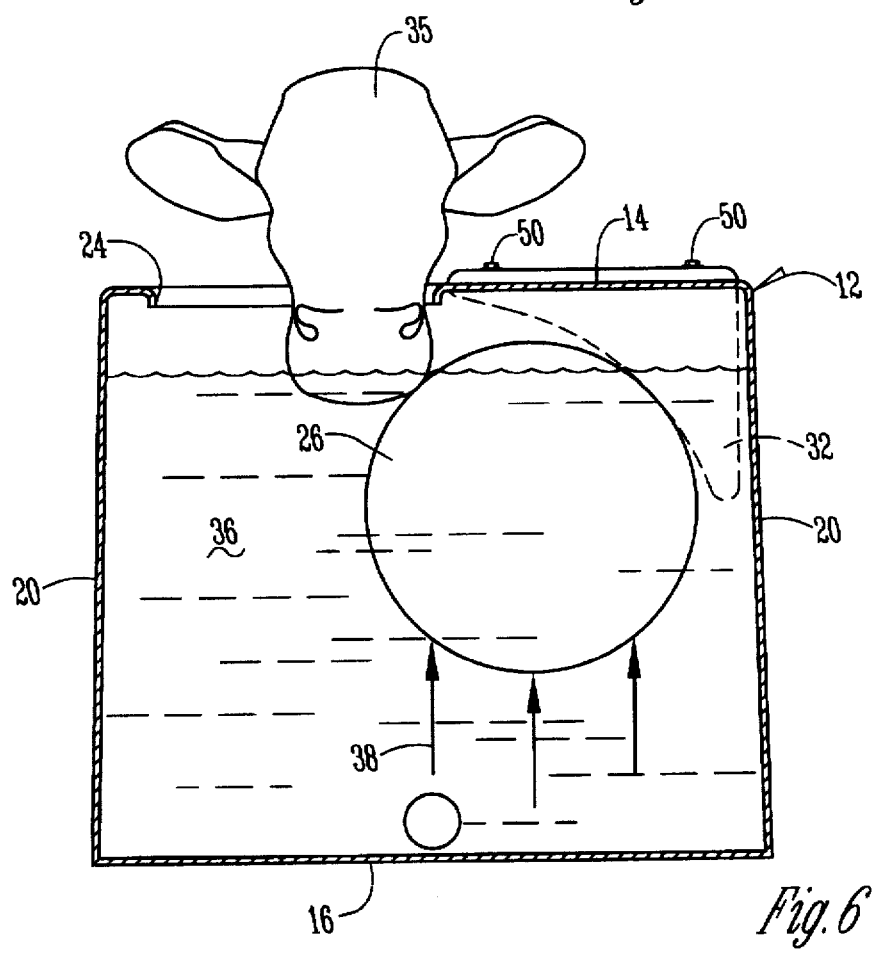
FIG. 6 is a cross-sectional view taken along line 6—6 in FIG. 3 similar to FIG. 5 but showing the animal having displaced the ball laterally and downwardly in the water in the tank.

The tank 12 has a pair of water access openings normally closed by a spherical ball float 26. As seen in FIG. 2, the balls 26 are restricted in their lateral movement by the tank end wall 18, back wall 20, and an interior upstanding retainer wall 30. Movement towards the front container wall 20 is controlled by a one-piece track member 32 which includes a concave downwardly curved path 34 facing the ball 26. Thus, as seen in FIG. 6, when an animal 35 displaces the ball 26 laterally to the side, the ball engages the curved path 34 and moves not only laterally but downwardly into the water 36 while being buoyed back to the opening 24 by the water pressure 38. The curved surface 34 will only permit the ball to move back to the access opening 24 and the further the ball moves into the water the more pressure will be created to return it to the closed position.

The track member 32 is three sided with the other two sides being flat and extending at ninety degrees to each other, such that the upper end of the curved path 34 terminates at the outer free end of the horizontal side, while the lower end of the curved surface terminates at the lower end of the vertical flat side of the track member.

An upwardly facing recess 40 is provided in the bottom side of the top wall 14 and has a shape corresponding to the top flat side of the track member 32. Thus, the track member 32 is centered in the recess 40 and held against movement horizontally. A pair of screws 50 hold the track member 32 to the bottom surface of the top wall 14.

It is seen that the animal watering tank of this invention is of simple construction in that the entire tank is of a one piece molded construction. A panel 52 centrally located is removable to allow entry of the balls 26 into the tank, followed by the track members 32 being bolted in place by the screws 50.

What is claimed is:

1. A animal watering tank comprising, a tank for receiving water from a water source and having a top, a bottom and a sidewall, each of said top, bottom and sidewall having an interior surface and an exterior surface, an opening extending through said top disposed for access by the head of an animal, a buoyant ball float for normally closing said opening and being rollable laterally away from said opening in response to force applied to said ball by the head of an animal seeking a drink whereby water is presented to the animal for drinking, a water inlet means adapted to be connected to said water source and extending into said tank for supplying additional water to said tank when the water level therein recedes to a predetermined level, valve means for maintaining water in said tank at a level below said opening but sufficiently high to hold said ball float against said interior surface of said top whereby said opening is normally closed by said ball float, track means at the interior surface of said top of said tank, said track means extending from said opening horizontally and laterally towards said sidewall and downwardly towards said bottom, said track means being constructed to guide said ball float downwardly and laterally away from said opening against the pressure of water in said tank tending to return said ball float along said track to said opening, said track means being curved and extending horizontally and laterally towards said sidewall and downwardly towards said bottom, said track means being of one piece construction and including three sides with said one side being curved, and said other two sides of said track means being horizontally and vertically extending and meeting at adjacent ends, and at opposite ends meeting with opposite ends of said curved one side.

2. The animal watering tank of claim 1 wherein said track means extending downwardly towards said bottom terminates in a lower end portion which is at a distance above said bottom sufficient to prevent said float from moving between said end portion and said bottom.

3. A animal watering tank comprising, a tank for receiving water from a water source and having a top, a bottom and a sidewall, each of said top, bottom and sidewall having an interior surface and an exterior surface, an opening extending through said top disposed for access by the head of an animal, a buoyant ball float for normally closing said opening and being rollable laterally away from said opening in response to force applied to said ball by the head of an animal seeking a drink whereby water is presented to the animal for drinking, a water inlet means adapted to be connected to said water source and extending into said tank for supplying additional water to said tank when the water level therein recedes to a predetermined level, valve means for maintaining water in said tank at a level below said opening but sufficiently high to hold said ball float against said interior surface of said top whereby said opening is normally closed by said ball float, track means at the interior surface of said top of said tank, said track means extending from said opening horizontally and laterally towards said sidewall and downwardly towards said bottom, said track means being constructed to guide said ball float downwardly and laterally away from said opening against the pressure of water in said tank tending to return said ball float along said track to said opening, and said track means being secured to said top wall interior surface by fasteners extending from the exterior surface of said top wall through said top wall into said track means.

4. The animal watering tank of claim 3 wherein said track means extending downwardly towards said bottom terminates in a lower end portion which is it a distance above said bottom sufficient to prevent said float from moving between said end portion and said bottom.

5. The animal watering tank of claim 3 wherein said top wall has an upwardly recessed area in said interior surface, said recessed area receiving said horizontal side of said track means to position and limit lateral movement of said track means.

6. The animal watering tank of claim 5 wherein said recessed area and the area of said horizontal side are substantially equal.

\* \* \* \* \*